US007603086B2

(12) United States Patent
Matsubayashi

(10) Patent No.: US 7,603,086 B2
(45) Date of Patent: Oct. 13, 2009

(54) RADIO DEVICE

(75) Inventor: Toshiaki Matsubayashi, Ichikawa (JP)

(73) Assignee: Kabushiki Kaisha TOSHIBA, Tokyo (JP)

( * ) Notice: Subject to any disclaimer, the term of this patent is extended or adjusted under 35 U.S.C. 154(b) by 572 days.

(21) Appl. No.: 11/515,288

(22) Filed: Sep. 1, 2006

(65) Prior Publication Data

US 2007/0232229 A1 Oct. 4, 2007

(30) Foreign Application Priority Data

Mar. 29, 2006 (JP) ............................ 2006-089859

(51) Int. Cl.
*H04B 17/00* (2006.01)

(52) U.S. Cl. ................. 455/67.11; 455/423; 455/67.13; 455/67.14; 455/115.2; 348/193; 348/569

(58) Field of Classification Search ............. 455/67.11, 455/423, 67.13, 67.14, 115.2, 226.1, 3.02; 348/193, 569, 570
See application file for complete search history.

(56) References Cited

U.S. PATENT DOCUMENTS 4,743,887 A * 5/1988 Pothier ....................... 340/531
5,714,885 A * 2/1998 Lulham ...................... 324/529
5,754,560 A * 5/1998 Nousiainen et al. ......... 714/716
6,380,748 B1 * 4/2002 Kang et al. ................. 324/645
6,661,373 B1 * 12/2003 Holliday ..................... 342/359
6,668,160 B2 * 12/2003 Schmitt et al. ........... 455/67.14
6,741,843 B1 * 5/2004 Kalliokulju et al. ...... 455/226.1
6,982,745 B2 * 1/2006 Miyabayashi ............... 348/193
7,062,235 B2 * 6/2006 Henriksson .............. 455/115.2
7,443,172 B2 * 10/2008 Fraedrich .................... 324/543
2001/0025330 A1 9/2001 Oi et al.
2001/0041538 A1 * 11/2001 Schmitt et al. ............. 455/67.4
2002/0002036 A1 * 1/2002 Uehara et al. ................. 455/41
2002/0042894 A1 * 4/2002 Henriksson .................. 714/25
2004/0075771 A1 * 4/2004 Miyabayashi ............... 348/570
2006/0030278 A1 * 2/2006 Konaka ....................... 455/78

(Continued)

FOREIGN PATENT DOCUMENTS

JP 05-161140 A 6/1993

(Continued)

OTHER PUBLICATIONS

Japanese Office Action (and English translation thereof) dated Feb. 26, 2008, issued in counterpart Japanese Application.

(Continued)

*Primary Examiner*—Matthew D Anderson
*Assistant Examiner*—Minh D Dao
(74) *Attorney, Agent, or Firm*—Frishauf, Holtz, Goodman & Chick, P.C.

(57) ABSTRACT

A device main unit transmits a bus reset pulse to an antenna unit via a cable transmitting a television reception signal, a controller of the device main unit detects a response of a presence pulse to the bus reset pulse and displays the detection result. The transmission of the bus preset pulse and the reception of the presence pulse are performed by utilizing the existing communication interface with 1-Wire type interactive baseband communication system disposed to control a tunable radio frequency circuit provided for the antenna unit from the controller adopted thereto.

6 Claims, 5 Drawing Sheets

U.S. PATENT DOCUMENTS

| | | | | |
|---|---|---|---|---|
| 2006/0181284 | A1* | 8/2006 | Fraedrich | 324/543 |
| 2007/0147319 | A1* | 6/2007 | Saito et al. | 370/338 |
| 2008/0126420 | A1* | 5/2008 | Wright et al. | 707/104.1 |
| 2008/0130599 | A1* | 6/2008 | Horikoshi et al. | 370/338 |
| 2008/0165252 | A1* | 7/2008 | Kamimura | 348/155 |
| 2008/0224927 | A1* | 9/2008 | De Abreu | 342/357.12 |
| 2008/0224943 | A1* | 9/2008 | Konaka | 343/876 |
| 2008/0318540 | A1* | 12/2008 | Homan et al. | 455/277.1 |
| 2009/0051591 | A1* | 2/2009 | Nakajima et al. | 342/367 |

FOREIGN PATENT DOCUMENTS

| | | | |
|---|---|---|---|
| JP | 11-261455 | A | 9/1999 |
| JP | 2001-282569 | A | 10/2001 |
| JP | 2002-217791 | A | 8/2002 |
| JP | 2002-353911 | A | 12/2002 |

OTHER PUBLICATIONS

Japanese Office Action (and English translation thereof) dated Sep. 30, 2008, issued in a counterpart Japanese Application.

* cited by examiner

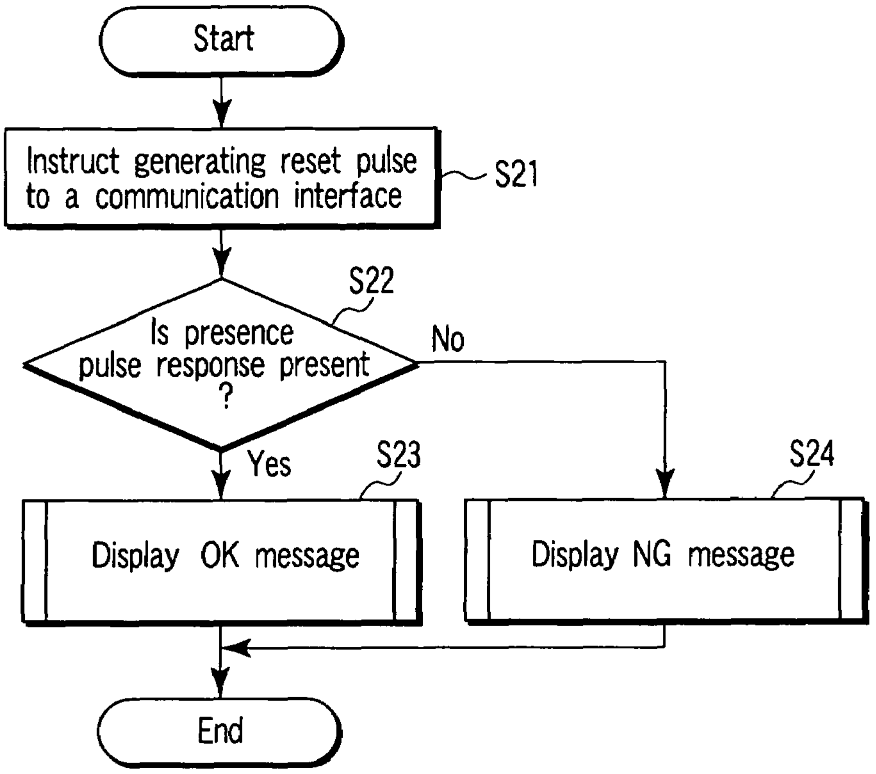
F I G. 2
F I G. 3
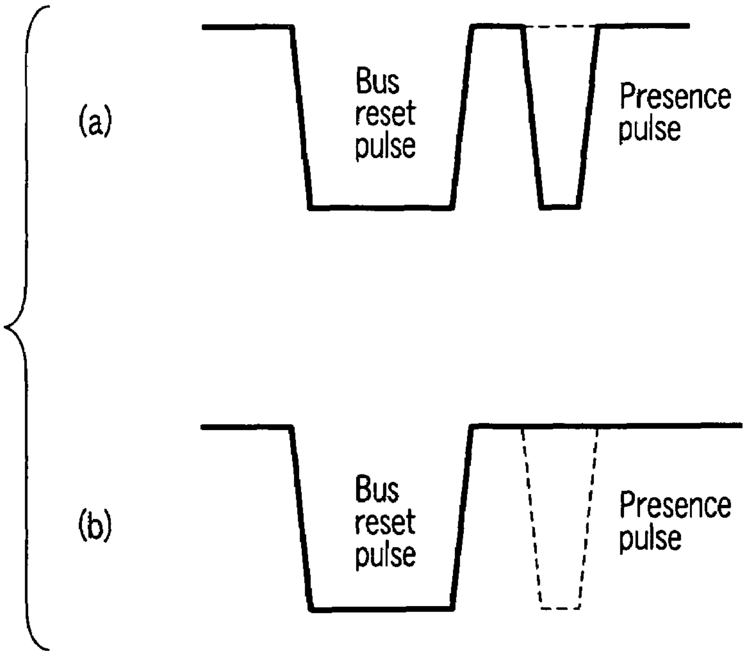

RADIO DEVICE

CROSS-REFERENCE TO RELATED APPLICATIONS

This application is based upon and claims the benefit of priority from prior Japanese Patent Application No. 2006-089859, filed Mar. 29, 2006, the entire contents of which are incorporated herein by reference.

BACKGROUND OF THE INVENTION

1. Field of the Invention

The present invention relates to a radio device, for instance, like a television receiver, which connects between an antenna unit and a device main unit via a cable such as a coaxial cable.

2. Description of the Related Art

In general, a television broadcast receiver is composed of an antenna unit, and a device main unit with a receiving circuit, an image processing circuit, a display unit, etc. incorporated therein. In the case of a stationary type, the device main unit is set within doors, the antenna unit is set out of doors, and these units are connected via such a cable as a coaxial cable. Like this, the setting of the antenna unit out of doors or the outside of a vehicle enables maintaining reception sensitivity high (for example, refer to Jpn. Pat. Appln. KOKAI Publication No. 5-161140).

However, the television broadcast receiver cannot obtain desired reception sensitivity depending on the setting state of the antenna unit, and especially, in the case of terrestrial digital broadcast, it cannot receive at all sometimes. This case is apt to be caused particularly when a user set up the receiver by himself. In such a case, it is impossible for the user to distinguish whether a cause that broadcast cannot be received comes from a reception defect depending on the setting state, etc. of the antenna unit or from a wrong connection of wiring between the antenna unit and the device main unit.

BRIEF SUMMARY OF THE INVENTION

The present invention is invented by aiming the aforementioned situation, an object of the invention is to provide a radio device enabling a user to simply and accurately distinguish a cause that a radio frequency (RF) signal cannot be transmitted or received and improving a convenience in installing or adjusting the radio device.

An aspect of the present invention is that in a radio device in which an antenna unit transmits an RF signal for transmitting or receiving via a cable between the antenna unit and a device main unit, the radio device newly comprises a communication interface configured to transmit a communication signal deferring from the RF signal between the antenna unit and the device main unit, and a defect detector using the communication means. The defect detector monitors the transmission state of the communication signal to detect the defect between the antenna unit and the device main unit on the basis of the monitoring result, and presents the detection result to the user.

Therefore, according to the present invention, the radio device detects the defect between the antenna unit and the device main unit in accordance with the transmission state of the communication signal transmitted via the same cable together with the RF signal to present the detection result to the user. Accordingly, the user can determine the presence/absence of the defect between the antenna unit and the device main unit on the basis of the presented information. For instance, when the broadcast cannot be received, if the communication signal is not transmitted, the user can determine that a connection defect may occur between the antenna unit and the device main unit. On the contrary, when the communication signal is transmitted, the user can determine that any defect is not present between the antenna unit and the device main unit, and the connection or the installation defect may occur at the antenna unit.

In other words, according to the present invention, the radio device is provided, which the user can easily and accurately distinguish the cause that the RF signal cannot be transmitted or received and the convenience in setting and adjusting the radio device is improved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is an exemplary flowchart showing a procedure and a processing content of a defect detection processing in the television broadcast receiver shown in FIG. 1;

FIG. 3 is an exemplary example of a control signal used in a defect detection processing shown in FIG. 2;

DETAILED DESCRIPTION OF THE INVENTION

Hereinafter, embodiments of the present invention will be described with reference to the drawings.

First Embodiment

Figure 1:
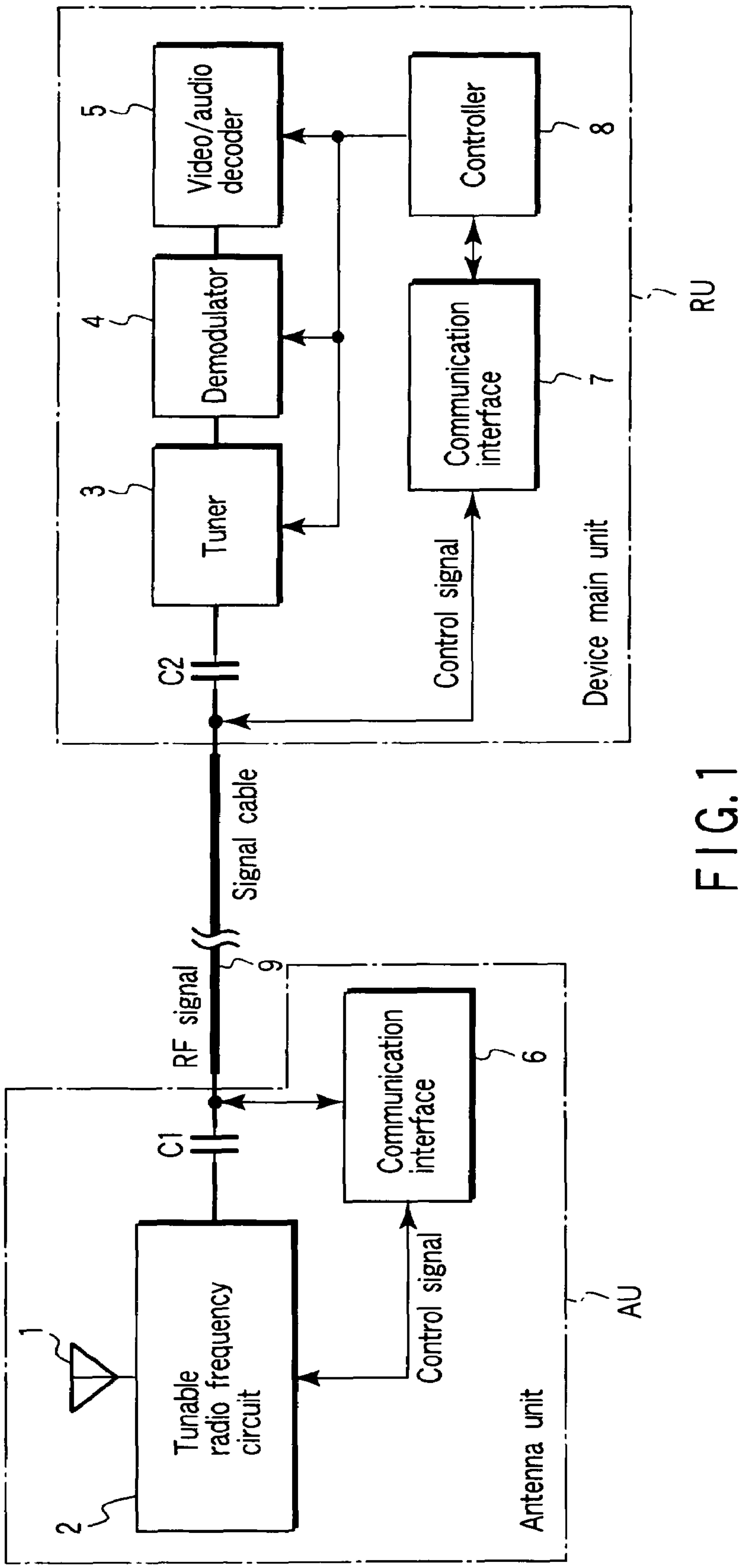
FIG. 1 is an exemplary block diagram showing a principal configuration of a television broadcast receiver that is a first embodiment of a radio device according the present invention.

FIG. 1 is the exemplary block diagram showing the principal configuration of the television broadcast receiver that is the first embodiment of the radio device regarding the present invention.

The broadcast receiver of the first embodiment is constituted as that, for instance, a device main unit RU installed in a vehicle and an antenna unit AU mounted on a roof at the outside of the vehicle are connected with each other via a cable 9 made of a coaxial cable.

An antenna unit AU has an antenna 1 and a tunable radio frequency circuit 2. Among of them, the radio frequency circuit 2 consists of an integrated circuit in which a tunable matching circuit, a tunable filter circuit and a low-noise amplifier (LNA) are integrated. In the tunable matching circuit and the tunable filter, matching impedance and a reception pass band property to the antenna 1 are variably controlled by a control signal transmitted from the below-mentioned device main unit RU, respectively. The radio frequency circuit 2 removes unnecessary wave components from the RF signal received from the antenna 1 in accordance with the reception pass band property, amplifies the RF signal through the LNA, and then transmits it to the cable 9.

On the other hand, the device main unit RU has a tuner 3, a demodulator 4, a video/audio decoder 5 and a controller 8 consisting of a micro computer. The tuner 3 selectively receives a signal corresponding to a reception target channel among RF signals transmitted from the antenna unit AU via the cable 9 in accordance with a control signal for a channel selection supplied from the controller 8. The demodulator 4 demodulates the reception signal output from the tuner 3 in accordance with a demodulation scheme applied from the controller 8 to output a reception baseband signal. The video/audio decoder 5 decodes video data and audio data included in the reception baseband signal in accordance with a decoding parameter applied from the controller 8 to output the decoded video signal and audio signal to a display device and a loudspeaker (not shown), respectively.

The antenna unit AU and the device main unit RU are provided with a first communication interface 6 and a second communication interface 7, respectively. The first and second communication interfaces 6 and 7 are used for transmitting the control signal output from the controller 8 to the antenna unit AU via the cable 9, and as for a communication system, a 1-Wire type interactive baseband communication system is used. The 1-Wire type interactive baseband communication system converts a signal to be transmitted into an interactive serial signal in a prescribed format to superpose it on the cable 9. With adoption of the 1-Wire type interactive baseband communication system, the device main unit RU can remotely control the tunable radio frequency circuit 2 of the antenna unit RU without adding a new control line between the antenna unit AU and the device main unit RU.

As to a communication interface with the 1-Wire type interactive baseband communication system adopted thereto, for instance, the 1-Wire (registered trademark) interface of Dallas Semiconductor is used. The home page of Maxim www.maxim-ic.com describes the detailed 1-Wire interface.

Blocking capacitors C1 and C2 acts so that a DC voltage applied to the first communication interface 6 of the antenna unit AU from the second communication interface 7 of the device main unit RU is not applied to the signal line between the radio frequency circuit 2 and tuner 3. Not having shown in FIG. 1, choke coils are interposed among the first, second communication interfaces 6, 7 and the cable 9, respectively. These choke coils separate, in the range of high frequencies, the first and second communication interfaces 6 and 7 from the cable 9.

Meanwhile, the television broadcast receiver regarding the first embodiment has a defect detecting means using a configuration to transmit the control signal. The defect detecting means monitors whether the transmission of control signal between the first and second communication interfaces 6 and 7 by means of the controller 8 to determine the connection defect, etc. between the antenna unit AU and the device main unit RU. And the detecting means displays the determination result of the connection defect on the display device (not shown).

Next to this, the operations of the broadcast receiver configured as mentioned above will be described. FIG. 2 is a flowchart showing the procedure and the content of the defect detection processing by the controller 8.

When turning on the receiver to start a reception operation of television broadcast, the control signal is transmitted from the controller 8 to the radio frequency circuit 2 of the antenna unit AU. At this time, in step S21, the controller 8 firstly instructs generation of a bus reset pulse to the second communication interface 7. As a result, as shown in FIG. 3 (*a*), the second communication interface 7 of the device main body unit RU generates the bus reset pulse. The bus reset pulse is transferred to the first communication interface 6 via the cable 9.

When normally receiving the bus reset pulse, the first communication interface 6, as shown in FIG. 3 (*a*), returns a presence pulse. This presence pulse is transferred to the second interface 7 via the cable 9. When receiving the presence pulse, the second communication interface 7 notifies the fact to the controller 8.

In step S22, the controller 8 monitors the presence/absence of the response of the presence pulse. If detecting the response of the presence pulse, the controller 8 determines that the antenna unit AU is normally connected to the device main unit RU. The controller 8 then shifts to step S23 to create a message showing the fact of the normal connection, for instance, "connection between antenna and device main unit is OK", and displays this OK message to the display device. Therefore, the user can confirm the fact that the antenna unit AU is normally connected to the device main unit RU through the OK message.

At this moment, it is supposed that a television video is not displayed on the display device after the lapse of the fixed time, even though the OK message has been displayed. The controller 8 then determines that the antenna unit AU has a reception defect to display the message showing the fact on the display device. Accordingly, in this case, the user can find the cause that the television video is not displayed comes from the case in which the antenna unit AU is not set correctly or the case in which the user is now at a place at which the broadcast waves cannot be received. The user then can take quickly and appropriately measures to re-install the antenna unit AU or move to a place at which the radio wave can be received.

In contrast, in the determination in step S22, for instance, as shown in FIG. 3 (*b*), it is presumed that the controller 8 has not enable detecting the response of the presence pulse within a fixed time after transmitting the bus reset pulse. In this case, the controller 8 determines that the broadcast receiver has the connection defect between the antenna unit AU and the device main body unit RU. The controller 8 then shifts to step S24 to generate a message showing the fact of the connection defect, for example, "connection between antenna and device main unit is NG" to display this NG message on the display device. Therefore, the user finds that the antenna unit AU is not normally connected to the device main unit RU; thereby the user can quickly take appropriate measures to re-connect the cable 9.

As mentioned above, in the first embodiment, the broadcast receiver transmits the bus reset pulse from the device main unit RU to the antenna unit AU via the cable 9 transmitting the television reception signal. The controller 8 detects the response of the presence pulse to the bus reset pulse to display the detection result on the display device. Thereby, the user becomes possible to clearly know whether the connection between the antenna unit AU and the device main unit RU is normal or not.

Further, the broadcast receiver transmits the bus reset pulse and receives the presence pulse by using the first and second communication interfaces 6 and 7 employing the 1-Wire type interactive baseband communication system. At this moment, the first and second communication interfaces 6 and 7 are the existing control signal communication means provided for remotely controlling the tunable radio frequency circuit 2 of the antenna unit AU from the controller 8 of the main device unit RU. Thus, there is no need to newly install an exclusive communication means for detecting the connection defect, thereby; the present invention has an advantage to be easily and inexpensively realized.

Second Embodiment

A second embodiment of the present invention is constituted as that a television broadcast receiver having a plurality of antenna units (antenna branches) to adopt a reception diversity scheme enhancing a reception quality by switching over or combining broadcast reception signals through the antenna units detects to display connection defects among each antenna unit and a device main unit, respectively, and also controls so as to separate antenna branches with the connection defects are detected therein.

Figure 4:
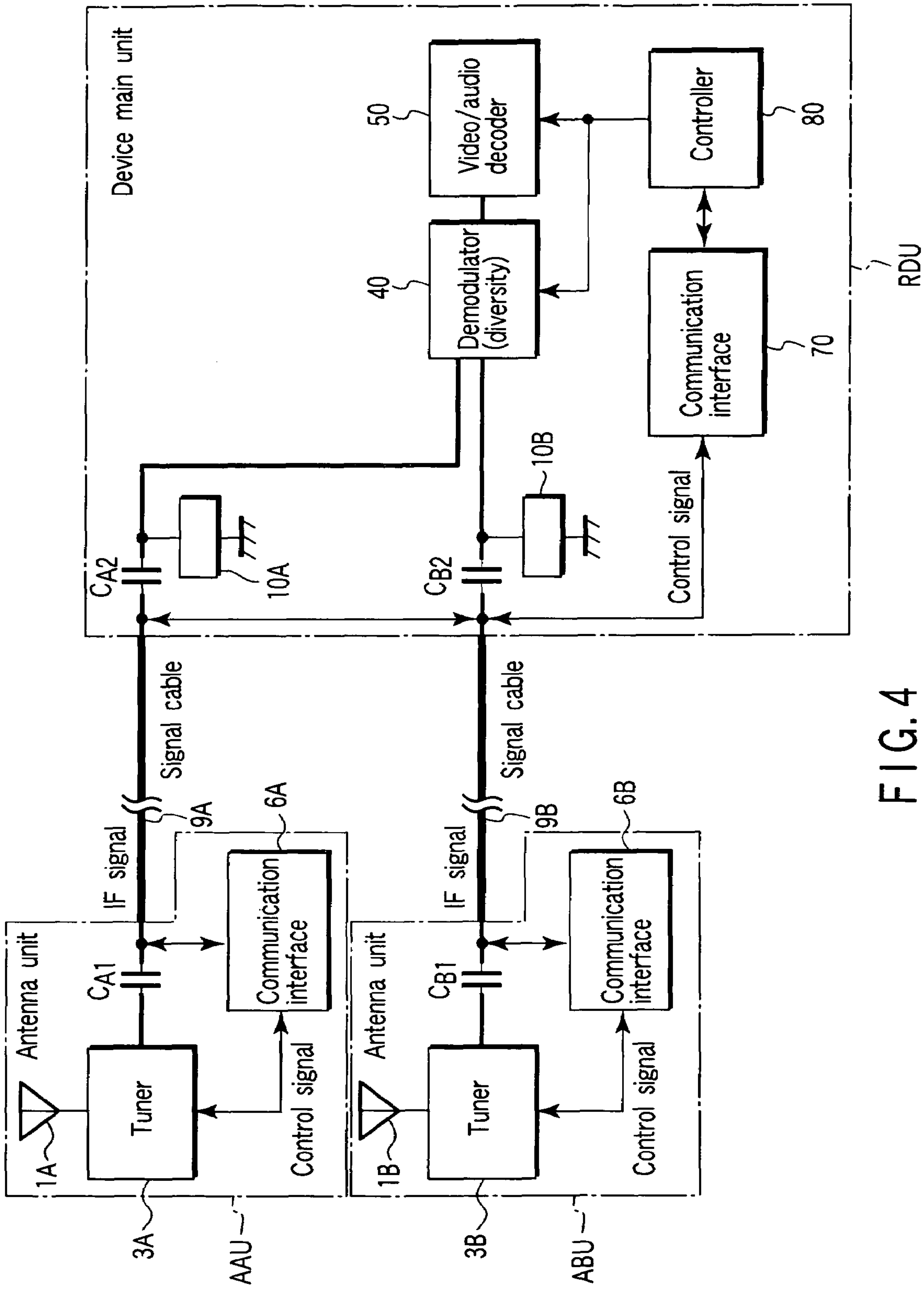
FIG. 4 is an exemplary block diagram showing a principal configuration of a television broadcast receiver that is a second embodiment of the radio device regarding the present invention.

FIG. 4 is the block diagram showing the principal configuration of the television broadcast receiver that is the second embodiment of the radio device regarding the present invention.

The broadcast receiver of the second embodiment disposes a first and a second antenna units AAU and ABU on a roof of a vehicle with a fixed distance and also disposed a device main unit RDU in the vehicle. The respective antenna units AAU and ABU are individually connected to the device main unit RDU via cables 9A and 9B such as a coaxial cable, respectively.

The first antenna unit AAU has an antenna 1A and a tuner 3A, and similarly, the second antenna unit ABU has an antenna 1B and a tuner 3B. Among these units, the tuners 3A and 3B each consist of integrated so-called silicon tuners, and selectively receives RF signals in the reception target channels in accordance with control signals applied from a controller 80 of the below-mentioned device main unit RDU to output reception signals consisting of intermediate frequencies (IFs) to the cables 9A and 9B.

The device main unit RDU has a demodulator 40, a video/audio decoder 50, and a controller 80 consisting of a microcomputer. The demodulator 40 respectively demodulates the broadcast reception signals of the IFs transmitted from the tuners 3A and 3B of each antenna unit AAU and ABU via the cables 9A and 9B in accordance with the demodulation scheme granted from the controller 80. The device main unit RDU switches over or synthesizes the respective demodulated signals in accordance with the instruction from the controller 80 to output reception baseband signals. The video/audio decoder 5 decodes video data and audio data included in the baseband signal in accordance with the decoding parameter supplied from the controller 8. And the video/audio decoder 5 outputs the video signal and the audio signal reproduced through this decoding to the display device and the loudspeaker (not shown), respectively.

The each of the antenna units AAU and ABU are respectively provided with first communication interface 6A and 6B, and also the device main unit RDU is provided with a second communication interface 70. The first communication interfaces 6A and 6B, and the second communication interface 70 are used for transmitting the control signal output from the controller 80 to the antenna units AAU and ABU via the cables 9A and 9B, respectively. And as for the communication system, in a similar manner of the first embodiment, the 1-Wire type interactive baseband communication system consisting of the 1-Wire (registered trademark) interface is used.

Figure 5:
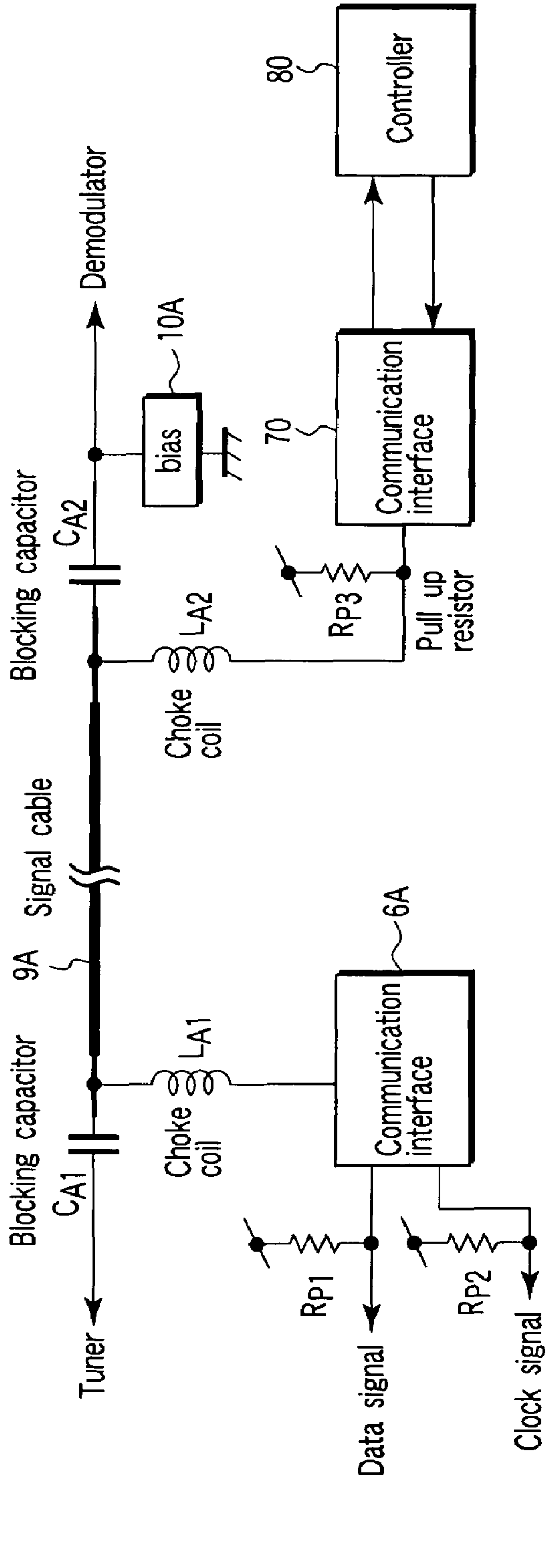
FIG. 5 is an exemplary view showing a configuration of a control signal communication means in the broadcast receiver shown in FIG. 4.

FIG. 5 is a view showing an example of a connection configuration of the first communication interfaces 6A and 6B and the second communication interface 70 to the cables 9A and 9B. In FIG. 5, only one communication interface 6A among the communication interfaces 6A and 6B is shown and the other communication interface 6B is omitted for making FIG. 5 simple.

The first communication interface 6A is composed of a IIC bus bridge integrated circuit (IC). A IIC bus signal terminal and a clock terminal of the IIC bus bridge IC are connected to a tuner 3A, and thereby a control signal (data signal) and a clock signal are supplied to the tuner 3A from the IIC bus bridge IC. The 1-Wire signal terminal of the IIC bus bridge IC is connected to the cable 9A through a choke coil LA1; thereby 1-Wire signals are transmitted and received to and from the cable 9A. The choke coil LA1 acts not to degrade radio frequency properties of the cables 9A and 9B by separating between the communication interfaces 6A, 6B and the cables 9A, 9B in the range of high frequencies.

On the other hand, the second communication interface 70 is also composed of the IIC bus bridge IC. The IIC bus signal terminal and the clock terminal of the IIC bus bridge IC are connected to the controller 80; thereby the control signal and clock signal are transmitted and received to and from the controller 80. The 1-Wire signal terminal of the IIC bus bridge IC is connected to the cable 9A through a choke coil LA2. Therefore, the second communication interface separates the communication interface 70 from the choke coil LA2 in the range of the high frequencies so as not to degrade the radio frequency properties of the cables 9A and 9B. This configuration goes same between the communication interface 70 and the cable 9B. The 1-Wire signal terminal is pulled up by a pull up resistor RP3. This pull up resistor PR3 defines a DC current level of the 1-Wire signal. Blocking capacitors CA1 and CA2 are interposed between the cable 9A, the tuner 3A, and also the demodulator 40. Thereby, the tuner 3A and the demodulator 40 are not influenced from the DC current defined by the pull up register PR3.

Figure 6:
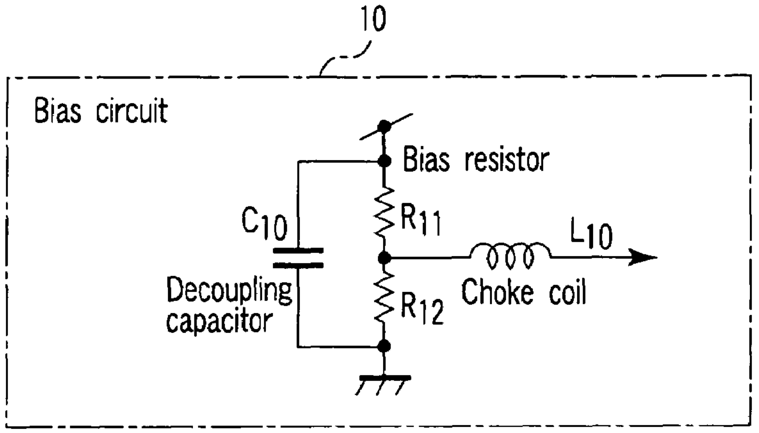
FIG. 6 is an exemplary circuit view showing an example of a bias circuit set up in the broadcast receiver shown in FIG. 4.

In the device main unit RDU, a bias circuit 10 is connected between the blocking capacitor CA2 and the demodulator 40. The bias circuit 10 supplies an optimum DC voltage level to the demodulator 40. And the bias circuit 10 is configured as to, for instance, as shown in FIG. 6, voltage-divide a power source voltage into half through bias registers R11 and R12, generate a bias voltage, and apply this bias voltage to the demodulator 40 through a choke coil L10. The capacitor C10 is a decoupling capacitor.

Figure 7:
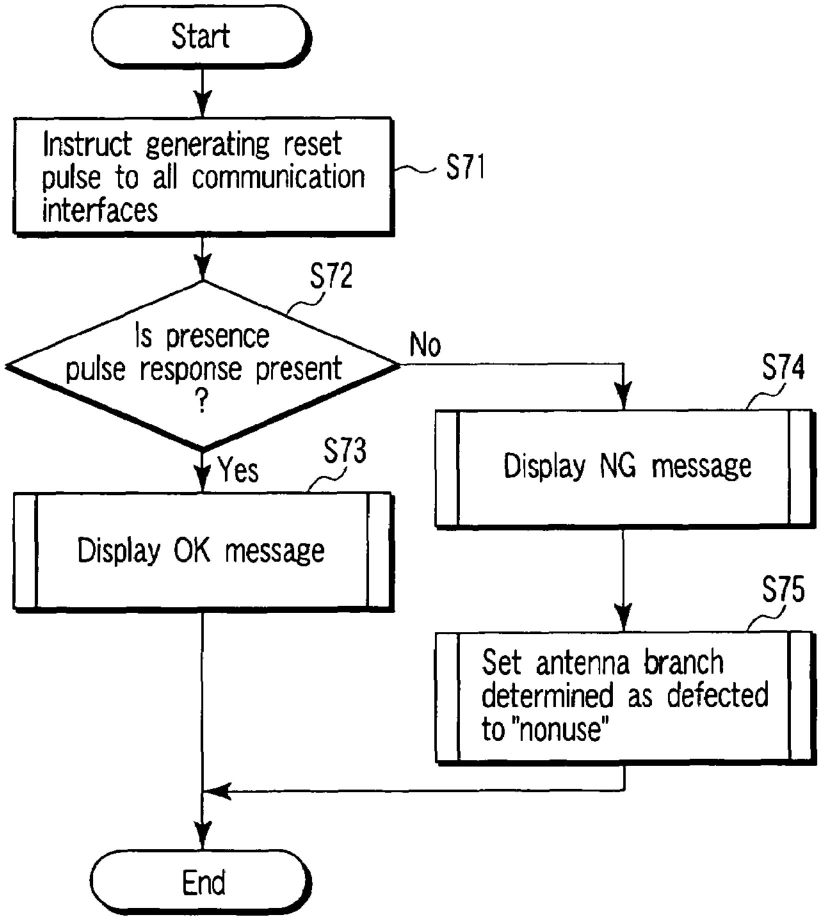
FIG. 7 is an exemplary flowchart showing a procedure and a processing content of a defect detection processing in the broadcast receiver shown in FIG. 4.

Next, operations of the television broadcast receiver configured as mentioned above will be described. FIG. 7 is a flowchart showing a procedure and a content of the defect detection processing by the controller 80.

When turning on the radio device to start the reception operation of the television broadcast, the controller 80 transmits channel control signals to the tuners 3A and 3B of the antenna units AAU and ABU. At this moment, in step S71, the controller 80 firstly instructs generating bus reset pulses to the second communication interface 70. As a result, the second communication interface 70 of the second communication interface 70 generates bus reset pulses as shown in FIG. 3 (*a*).

The bus reset pulses are transferred to the first communication interfaces 6A and 6B of the antenna units AAU and ABU via the cables 9A and 9B, respectively.

When normally receiving the bus rest pulses, the first communication interfaces 6A and 6B each return the presence pulses as shown in FIG. 3 (*a*). The presence pulses are transferred to the second communication interface 70 via the cables 9A and 9B. When receiving the presence pulses, the second communication interface 70 notifies the fact to the controller 80.

In step S72, the controller 80 monitors the presence/absence of the responses for each antenna unit AAU and ABU. If detecting the responses of the presence pulses, the controller 80 determines that the antenna units AAU and ABU are normally connected to the device main unit RDU, respectively. The controller 80 then shifts to step S73 to create a message showing the fact of the normal connection, for instance, "connection between antenna and device main body is OK" to display the OK message onto the display device. Therefore, the user can confirm that the antenna units AAU and ABU are each connected to the device main body RDU normally by means of the OK message.

In this circumstance, even though the OK massage has been displayed, it is supposed that even when a fixed time has lapsed, the television video does not appear on the display device. In this case, the controller 80 determines that both the antenna units AAU and ABU each have the reception defects to display the message showing the fact onto the display device. Accordingly, the user can understand that the reason that the television video is not displayed comes from wrong installations of the antenna units AAU and ABU or comes from the being of the user at the place at which the broadcast radio waves cannot be received. The user can quickly and appropriately take measures to re-install the antenna units AAU and ABU, or move to the place at which the radio waves can be received.

On the other hand, it is supposed that, in the determination in step S72, at either the cable 9A or 9B, for instance, as shown is FIG. 3 (*b*), the response of the presence pulse has not been detected within the fixed time after transmitting the bus reset pulses. In this case, the controller 80 determines that the radio device has the connection defect between the antenna unit AAU and the device main unit RDU, or between the antenna unit ABU and the device main unit RDU. The controller 80 then makes a shift to step S74 to create the message showing the fact, for instance, "connection between antenna and device main unit is NG" to display it on the display device. Therefore, the user can recognize that the antenna AAU or ABU is not normally connected to the device main unit RU. The user then can immediately take appropriate measures such as a re-connection of the cables 9A or 9B.

It is presumed that the controller 80 cannot detect the response of the presence pulse through either the cable 9A or 9B in step S72, then, the controller 80 shifts to step S75 and controls to separate the antenna branch on the side where the response of the presence pulse cannot be detected from the reception target. For example, it is supposed that the response of the presence pulse at the cable 9A, the controller 80 then issues the instruction to separate the group of the antenna unit AAU to the demodulator 40. As a result, the demodulator 40 omits the reception signal from the antenna unit AAU and demodulates only the reception signal from the antenna unit ABU to out put the demodulated signal to the video/audio decoder 50. Therefore, it is prevented for the failure that noise, etc. from the defected group from influencing adverse effects on the reception video and the reception audio.

As described above, in the second embodiment, the device main unit RDU transmits the bus reset pulses to each antenna unit AAU and ABU via the cables 9A and 9B transmitting the television reception signals, the controller 80 detects the responses of the presence pulses to the bus reset pulses, and displays the detection result on the display device. Thus, the user can accurately observe whether or not the antenna units AAU and ABU are normally connected to the device main unit RDU.

The transmissions of the bus preset pulses and the receptions of the presence pulses are performed by utilizing the first and the second communication interfaces 6A, 6B and 70 that are existing communication interface with 1-Wire type interactive baseband communication system disposed to control the tuners 3A and 3B provided for the antenna units AAU and ABU from the controller 80 of the device main unit RDU adopted thereto. Thereby, the second embodiment has no need to newly install an exclusive communication means to detect the connection defect, then, it has an advantage to be realized with ease and at a low cost.

Further, when the response of the presence pulse has not been detected via either the cable 9A or 9B, the antenna branch on the side at which the presence pulse has not been detected is separated from the reception target. Therefore, the second embodiment can prevent the failure that the noise, etc. influences the adverse effects on the reception video and the reception audio.

Other Embodiment

Having described the first and second embodiments by taking the case, in which the 1-Wire interface is used as the communication interface to transmit the control signal between the antenna unit and the device main unit, as examples, the present invention is not limited to such embodiments, other communication interface such as an HDQ interface made by Texas Instruments is usable.

Having described the first and second embodiments by taking the television broadcast receiver as examples, the present invention is not limited to such embodiments; the present invention is applicable to a business-oriented radio device such as a community wireless receiver and a taxi wireless system. That is, not limited to a receive-only radio device, but the embodiments are applicable to a transmit-only radio device and a radio device having a transmission function and a reception function.

Other than this, it is possible to make a variety of modifications to implement the configuration of the defect detecting means using the control signal, the procedure and content of the defect detection processing, the kinds and configurations of the signal used for the defect detection, the content of the message showing the defect detection result, the configuration of the presentation means for presenting the relevant message to the user (not limited to display but presentation through voice message is preferable), the kinds and their connection configurations of the cables, etc., without departing from the aspect of the invention.

To put it briefly, the present invention is not limited to the aforementioned embodiments as they are, on an implementation phase, this invention may be embodied in various forms without departing from the inventive concept thereof. Various types of the inventions can be formed by appropriately combining a plurality of constituent elements disclosed in the foregoing embodiments. Some of the elements, for example, may be omitted from the whole of the constituent elements shown in the embodiments given above. Further, the constituent elements over different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio device including an antenna unit and a device main unit and a cable connecting the antenna unit with the device main unit, the radio device transmitting a radio frequency signal transmitted or received by the antenna unit between the antenna unit and the device main unit via the cable, comprising:

a communication interface configured to transmit a communication signal differing from the radio frequency signal between the antenna unit and the device main unit via the cable;

a defect detector configured to monitor a transmission state of the communication signal by the communication interface to detect a defect between the antenna unit and the device main unit on the basis of the monitoring result; and a presentation controller configured to control presentation of detection result from the defect detector to a user of the radio device.

2. The radio device according to claim 1, wherein the antenna unit comprises a radio frequency circuit controllable its operation state, the device main unit comprises a first control circuit generates a first control signal for controlling operation state of the radio frequency circuit, the communication interface comprises a circuit configured to transmit the first control signal generated from the first control circuit to the radio frequency circuit via the cable as the communication signal, and the defect detector comprises:

a monitor configured to monitor the transmission state of the first control signal; and a detector configured to detect the defect between the antenna unit and the device main unit on the basis of a monitoring result from the monitor.

3. The radio device according to claim 1, wherein the antenna unit comprises:

a plurality of antenna units; and a connector configured to connect each of the plurality of antenna units to the device main unit via different cables, the communication interface comprises a transmission circuit configured to transmit the communication signal among the plurality of antenna units and the device main unit via the different cables, respectively, and the defect detector comprises:

a monitor configured to monitor the transmission state of the communication signals transmitted from the communication interface via the different cables; and a detector configured to individually detecting defects among the plurality of antenna units and the device main unit on the basis of a monitoring result from the monitor.

4. The radio device according to claim 3, further comprising:

a separator configured to separate antenna unit, at which a defect among a part of unit among the plurality of antenna units and the device main unit has been detected, from a transmission and a reception targets of the radio frequency signal when the defect has been detected.

5. The radio device according to any one of claims 1, 2, 3 and 4, wherein the communication interface comprises a first and a second 1-Wire type communication interface circuits provided for the antenna unit and the device main unit, respectively, and the first and the second 1-Wire type communication interface circuits comprises:

a converter configured to convert the communication signal into a signal form dividable for the radio frequency signal then transmitting it to the cable; and a separator configured to separate the communication signal transmitted via the cable from the radio frequency signal to receive it.

6. A radio device including an antenna unit and a device main unit and a cable connecting the antenna unit with the device main unit, the radio device transmitting a radio frequency signal transmitted or received by the antenna unit between the antenna unit and the device main unit via the cable, comprising:

a transmitter configured to transmit a communication signal to the antenna unit;

a defect detector configured to detect a defect between the antenna unit and the device main unit by monitoring a transmission state of the communication signal; and a informing controller configured to inform presentation of detection result from the defect detector to a user of the radio device.

* * * * *